United States Patent
Gresset

(10) Patent No.: US 10,153,852 B1
(45) Date of Patent: Dec. 11, 2018

(54) SYSTEM AND METHOD FOR QUANTIZING INTERFERENCE PROFILE

(71) Applicant: MITSUBISHI ELECTRIC CORPORATION, Tokyo (JP)

(72) Inventor: Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/778,766

(22) PCT Filed: Dec. 27, 2016

(86) PCT No.: PCT/JP2016/089231
§ 371 (c)(1),
(2) Date: May 24, 2018

(87) PCT Pub. No.: WO2017/122548
PCT Pub. Date: Jul. 20, 2017

(30) Foreign Application Priority Data

Jan. 13, 2016 (EP) .................................. 16151135

(51) Int. Cl.
*H04B 17/345* (2015.01)
*H04B 17/26* (2015.01)
(Continued)

(52) U.S. Cl.
CPC ............ *H04B 17/345* (2015.01); *H04B 17/26* (2015.01); *H04L 27/0006* (2013.01); *H04W 72/082* (2013.01)

(58) Field of Classification Search
CPC combination set(s) only.
See application file for complete search history.

(56) References Cited

U.S. PATENT DOCUMENTS

| 2011/0111701 A1* | 5/2011 | Park | H04W 72/082 455/63.1 |
| 2012/0243630 A1* | 9/2012 | Golovins | H04B 17/005 375/260 |

(Continued)

FOREIGN PATENT DOCUMENTS

| EP | 2 688 351 A1 | 1/2014 |
| EP | 2 866 509 A1 | 4/2015 |

(Continued)

*Primary Examiner* — Nay A Maung
*Assistant Examiner* — Erica L Fleming-Hall
(74) *Attorney, Agent, or Firm* — Birch, Stewart, Kolasch & Birch, LLP

(57) ABSTRACT

The invention concerns a method for quantizing an interference profile for a wireless telecommunication system along a path that a moving device takes, comprising: by the moving device, obtaining, during a measurement windows, measurements related to interference, processing the measurements performed during the measurement window to obtain for consecutive time periods of the measurement window at least a quantized interference related value and a weight representative of the number of measurements made within the time period index which have the same quantitized interference-related value, and transferring feedback information, by the server, receiving the feedback information, determining the location of the moving device along the path which corresponds to the measurement window, and converting the feedback information in a format of a database composed of a matrix comprising locations and interference quantization values, updating the database with the converted feedback information.

13 Claims, 5 Drawing Sheets

(51) Int. Cl.
*H04L 27/00* (2006.01)
*H04W 72/08* (2009.01)

(56) References Cited

U.S. PATENT DOCUMENTS

2015/0163817 A1* 6/2015 Brunel ................ H04W 72/082
370/329
2016/0036542 A1* 2/2016 Gong .................... H04W 24/10
370/329

FOREIGN PATENT DOCUMENTS

EP 2866509 A1 * 4/2015 .......... H04W 72/082
EP 3193468 A1 * 7/2017 .......... H04L 27/0006

* cited by examiner

[Fig. 1]
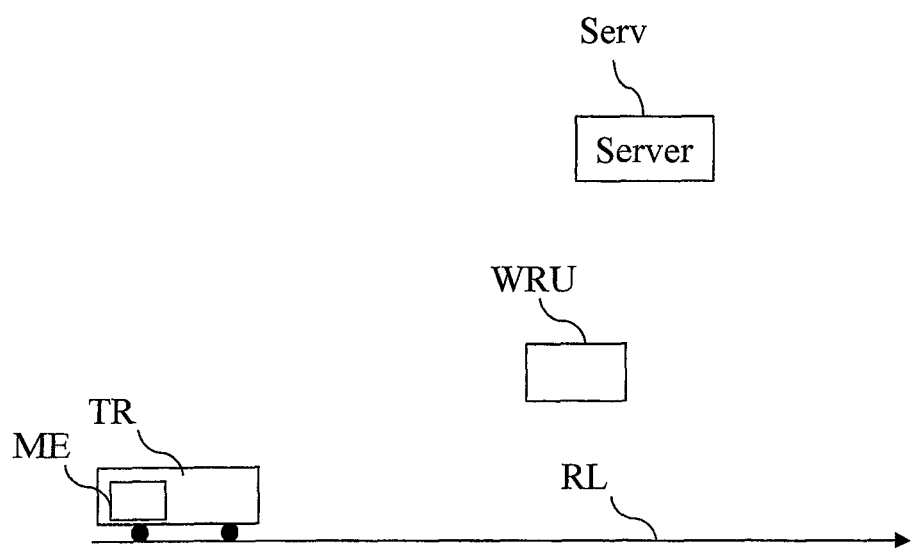

[Fig. 2]
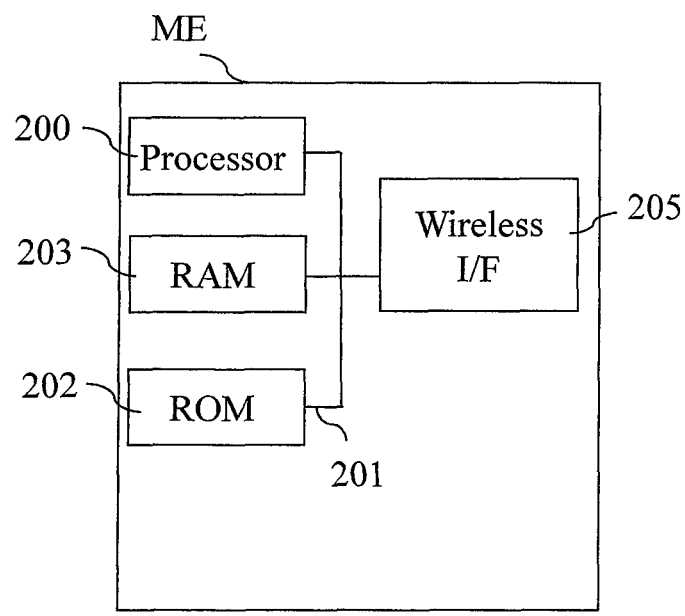
[Fig. 3]
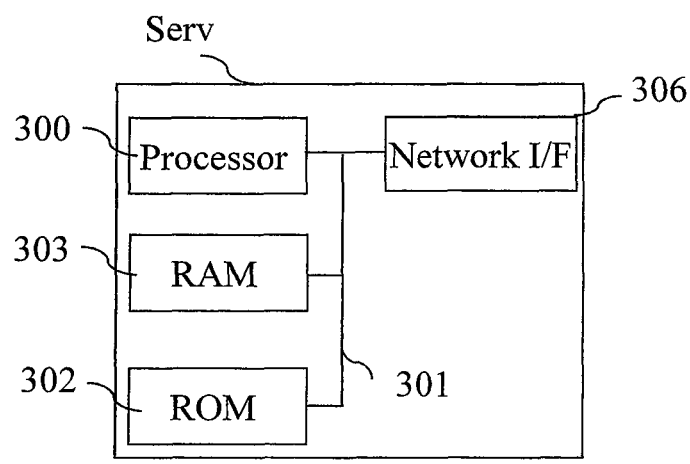

[Fig. 4]
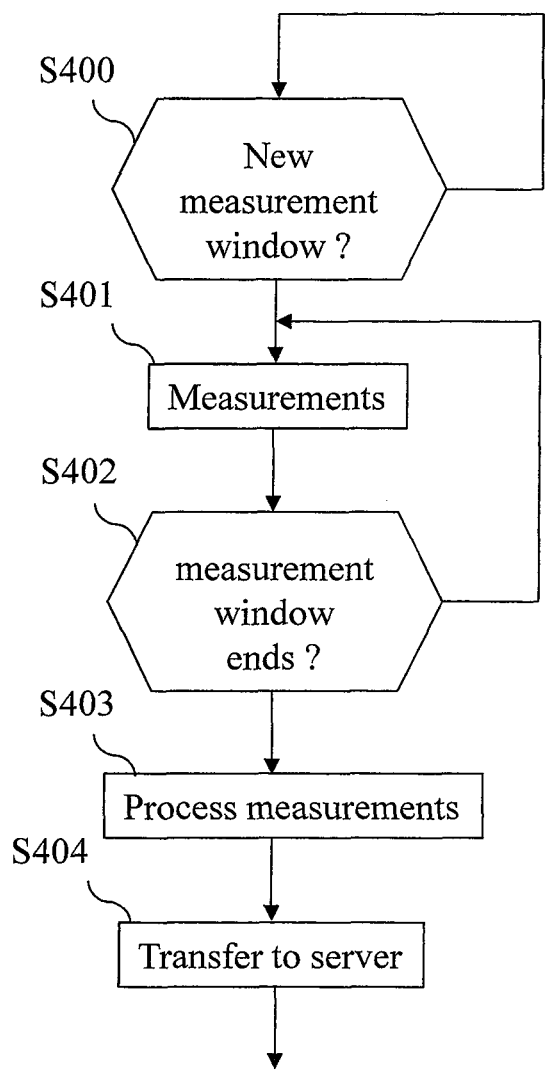

[Fig. 5a]
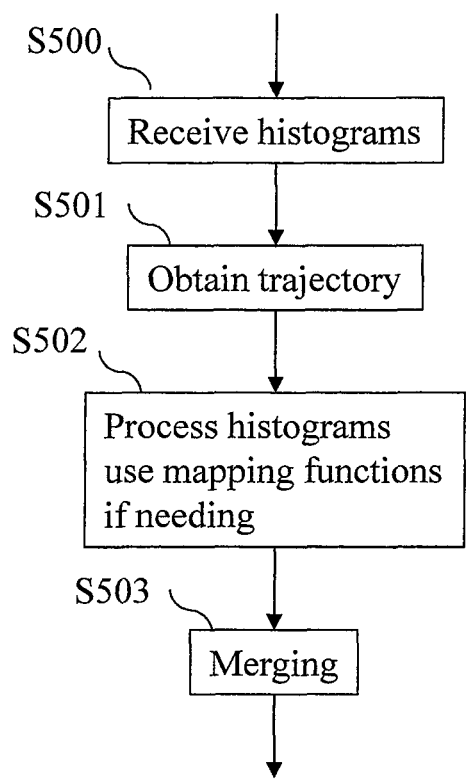

[Fig. 5b]
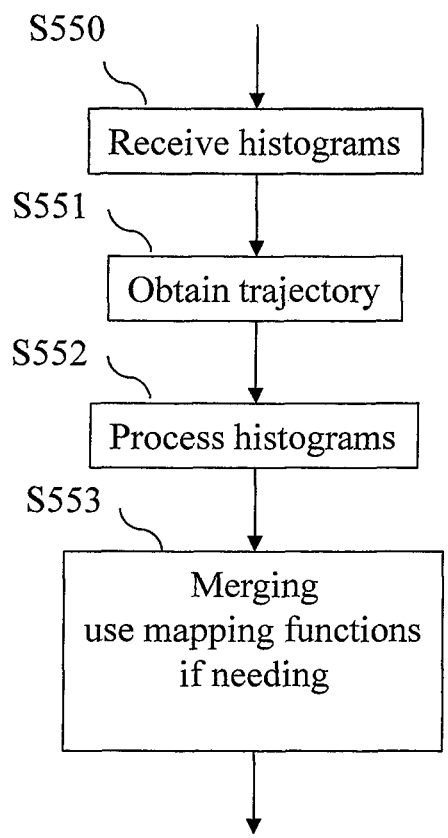

SYSTEM AND METHOD FOR QUANTIZING INTERFERENCE PROFILE

TECHNICAL FIELD

The present invention relates generally to a method and device for quantizing an interference profile for a wireless telecommunication system along a path that moving devices takes.

BACKGROUND ART

Cognitive radio is an intelligent radio that can be programmed and configured dynamically. The transceivers are designed to use the best wireless channels in their vicinity. Such radio transceivers automatically detect available channels in wireless spectrum, then accordingly change their transmission or reception parameters to allow more concurrent wireless communications in a given spectrum band at one location. This process is a form of dynamic spectrum management.

The cognitive radio main principle lies in sounding the radio environment in order to find the best resource for transmission. This is only possible if the radio environment doesn't change between the sounding and transmission period. When a telecommunication device moves, its radio environment changes quickly which does not allow using a cognitive radio approach.

Cognitive radio finds application in moving systems like for example communications-based train control (CBTC) system. Communications-based train control systems make use of the telecommunications between the train and track equipment for the traffic management and infrastructure control. By means of the CBTC systems, the exact position of a train may be known more accurately than with traditional signalling systems. This results in a more efficient and safer way to manage the railway traffic. Metros and other railway systems are able to improve headways while maintaining or even improving safety.

SUMMARY OF INVENTION

The present invention aims at improving the knowledge of interferences along a path that a moving device takes.

To that end, the present invention concerns a method for quantizing an interference profile for a wireless telecommunication system along a path that a moving device takes characterized in that the method comprises the steps of:
obtaining, by a moving device, during a measurement windows, measurements related to interference in the wireless telecommunication system along the path,
processing, by the moving device, the measurements performed during the measurement window in order to obtain for consecutive time periods of the measurement window at least a quantized interference related value from measurements performed within the time period and a weight representative of the number of measurements made within the time period index which have the same quantitized interference-related value,
transferring, by the moving device, feedback information which comprises at least the weights to a server through the wireless telecommunication system,
receiving, by the server, the feedback information,
determining, by the server, the location of the moving device along the path which corresponds to the measurement window,
converting, by the server, the feedback information in a format of a database composed of a matrix comprising locations and interference quantization values,
updating the database with the converted feedback information.

The present invention concerns also a system for quantizing an interference profile for a wireless telecommunication system along a path that a moving device takes, characterized in that the system comprises:
means, comprised in a moving device, for obtaining during a measurement windows, measurements related to interference in the wireless telecommunication system along the path,
means, comprised in the moving device, for processing the measurements performed during the measurement window in order to obtain for consecutive time periods of the measurement window at least a quantized interference related value from measurements performed within the time period and a weight representative of the number of measurements made within the time period index which have the same quantitized interference-related value,
means, comprised in the moving device, for transferring feedback information which comprises at least the weights to a server through the wireless telecommunication system,
means, comprised in the server, for receiving, by the server, the feedback information,
means, comprised in the server, for determining the location of the moving device along the path which corresponds to the measurement window,
means, comprised in the server, for converting the feedback information in a format of a database composed of a matrix comprising locations and interference quantization values,
means, comprised in the server, for updating the database with the converted feedback information.

Thus, by updating the database from the feedback information after each moving device travel, a position-based cognitive radio system can be efficiently applied and the invention allows to convert the measurements format into the database one.

According to a particular feature, the feedback information further comprises, for each weight, a time period index and a quantized interference value.

Thus, the feedback is a compressed version of more measurements performed at the moving device.

According to a particular feature, the feedback information further comprises, for each weight, centroid coordinates corresponding to the weight.

Thus, the position of the moving device for each weight is obtained directly.

According to a particular feature, the converting of the feedback information is performed using a first mapping function that maps the time periods to locations of the moving device along the path and using a second mapping function that maps weights to a format of interference-related values stored in the database.

Thus, even with a compressed feedback, the database can be easily updated after conversion.

According to a particular feature, the converting of the feedback information is further performed from the results of the mapping functions and using a temporary database having the same size as the database the databases being under the form of matrices and the matrix of the temporary database is updated using the mapped weights.

Thus, operations such as normalization can be performed on the temporary database before merging with the previous version of the database, which allows to keep it normalized along time.

According to a particular feature, the temporary database is a normalized temporary database such that the sum of each column of the normalized temporary database is equal to one.

Thus, an histogram of the information representative of the interference can be computed and updated for each quantized position in the database.

According to a particular feature, if feedback information further comprises for each weight centroid coordinates corresponding to the weight, the converting of the feedback information is further performed by superposing the matrix of the database to voronoi regions defined by the centroid and by applying a mask related to clusters positions in the temporary database and each mapped weight is used for updating the matrix of the temporary database according to the mask related to clusters positions in the temporary database.

Thus, the mask allows for a better reconstruction of the temporary database as if it was the feedback format, while the feedback format used is more compact.

According to a particular feature, the converting of the feedback information is further performed by applying a mask related to the mapped weights in the temporary database and each mapped weight is used for updating the matrix of the temporary database according to the mask related to the quantitized interference-related values.

Thus, the statistical properties of the wireless channel fading can be taken into account for a better reconstruction of the database.

According to a particular feature, the update of the database with the converted feedback information is performed by merging each mapped weight value in a cluster of the matrix of the temporary database weighted at least by the sum of the mapped weights in the column of the cluster and by the sum of the mapped weights in the row of the cluster to the cluster having the same position in the matrix of the database.

Thus, the update of the database is done on the fly without storing a large amount of measurements collected in the past.

According to a particular feature, if feedback information further comprises for each weight centroid coordinates corresponding to the weights, the update of the database with the converted feedback information is performed by superposing the matrix of the database to voronoi regions defined by the centroid and by applying a mask related to clusters positions in the database and each mapped weight is used for updating the matrix of the database according to the mask related to clusters positions in the database.

Thus, the mask allows for a better reconstruction of the database as if all the measurements were transferred and stored for building the database, while the feedback format is compact and less memory is used for computing the database.

According to a particular feature, the update of the database with the converted feedback information is performed by applying a mask related to the mapped weights in the database and each mapped weight is used for updating the matrix of the database according to the mask related to the mapped weights.

Thus, a mask taking into account the properties of the wireless fading channel or the path loss can be taken into account for a better update of the database.

According to a particular feature, the update of the database with the converted feedback information is performed by merging each mapped weight in a cluster of the matrix of the temporary database weighted at least by the sum of the mapped weights in the column of the cluster and by the sum of the mapped weights in the row of the cluster to the cluster having the same position in the matrix of the database.

Thus, the database can be updated and still be representative of histograms of the interference values for each quantized position associated to the database.

BRIEF DESCRIPTION OF DRAWINGS

The characteristics of the invention will emerge more clearly from a reading of the following description of example embodiments, the said description being produced with reference to the accompanying drawings, among which:

FIG. 1 represents an example of an architecture of a system for interference profile quantization for a wireless telecommunication system applied to a railway network;

FIG. 2 represents an example of the architecture of a measurement collecting device comprised in a train;

FIG. 3 represents an example of the architecture of a server in which the present invention is implemented;

FIG. 4 represents an example of an algorithm executed by the measurement collecting device according to the present invention;

FIG. 5a represents a first example of an algorithm executed by the server according to the present invention;

FIG. 5b represents a second example of an algorithm executed by the server according to the present invention.

DESCRIPTION OF EMBODIMENTS

FIG. 1 represents an example of an architecture of a system for interference profile quantization for a wireless telecommunication system applied to a railway network.

The system comprises a server Serv which is connected to a plurality of wayside radio units WRU in communication with trains through a wireless telecommunication system along a railroad RL.

When a moving device like a train TR moves, its radio environment changes quickly which makes difficult to implement a cognitive radio approach.

According to the present invention, the moving device TR comprises a measurement collecting device ME.

Some interferers exist in areas covered by the way side radio units. More an interferer is close to the railroad and/or to the wayside radio unit, more the interferer impacts the wayside radio unit to train radio communication performance.

Interferers may be constant or may vary in the time.

The train is assumed to make periodical or non-periodical measurements and feed them back to the wayside radio units WRU which transfer it to the server Serv. The server Serv build a fingerprint database of the interference in the area covered by each wayside radio units WRU and updates the database each time a train moves into one of the areas since the domain of positions the train can move on is limited to the railroads.

The database is decomposed into clusters. The size of the clusters stored in the database of interference makes a trade-off between the accuracy of the description of the interference at each position within the cluster, the robustness of the interference description to noise and the amount of traffic needed to update the database.

Furthermore, as radio environment changes, the database has to be updated according to the changes of the radio environment in each cluster. The robustness of one cluster database improves with the number of measurements, which can vary according to the moving device speed or to the number of travels within each cluster.

The database is representative of the random distribution of interference information like interference level, SINR, characteristic function of the interference. The database is defined for a given coverage area which is clusterized into small compact region of space. For example, for the railroad, the clusters are segments of the railroad. For each cluster, the distribution of the random variable related to interference is stored in a discrete fashion, i.e., in the form of a histogram.

In the train TR, a measurement window is defined during which the train collects all the measurements made at several time indexes for example every millisecond and builds a discrete estimation of the probability density function of the random variable related to the interference level. The discrete estimation of the probability density function is defined in two dimensions: the time dimension and the measured value dimension. Each cluster of the discrete estimation of the probability density function comprises the number of measurements samples belonging to a region of the time/measured value plane. Then, the discrete estimation of the probability density function is fed back to the server Serv. The amount of data for defining the discrete estimation of the probability density function and its average periodicity of feedback define the overhead of feedback traffic.

According to the invention:
- the moving device obtains, during a measurement windows, measurements related to interference in the wireless telecommunication system along the path,
- the moving device processes the measurements performed during the measurement window in order to obtain for consecutive time periods of the measurement window at least a quantized interference related value from measurements performed within the time period and a weight representative of the number of measurements made within the time period index which have the same quantized interference-related value,
- the moving device transfers feedback information which comprises at least the weights to a server through the wireless telecommunication system,
- the server receives the feedback information,
- the server determines the location of the moving device along the path which corresponds to the measurement window,
- the server converts the feedback information in a format of a database composed of a matrix comprising locations and interference quantization values,
- the server updates the database with the converted feedback information.

FIG. 2 represents an example of the architecture of a measurement collecting device comprised in a train.

The measurement collecting device ME has, for example, an architecture based on components connected together by a bus 201 and a processor 200 controlled by a program as disclosed in FIG. 4.

The bus 201 links the processor 200 to a read only memory ROM 202, a random access memory RAM 203 and a wireless interface 205.

The memory 203 contains registers intended to receive variables and the instructions of the program related to the algorithm as disclosed in FIG. 4.

The processor 200 receives through the wireless interface 205 measurements relative to interference. The wireless interface 205 enables the transfer of data between the measurement collecting device ME and the wireless radio unit WRU. The WRU transfers the received data to the server Serv and forwards data received from the server Serv to the measurement collecting device if needed.

The read-only memory, or possibly a Flash memory 202 contains instructions of the program related to the algorithm as disclosed in FIG. 4, when the measurement collecting device ME is powered on, to the random access memory 203.

The measurement collecting device ME may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the measurement collecting device ME includes circuitry, or a device including circuitry, causing the measurement collecting device ME to perform the program related to the algorithm as disclosed in FIG. 4.

FIG. 3 represents an example of the architecture of a server Serv.

The server Serv has, for example, an architecture based on components connected together by a bus 301 and a processor 300 controlled by a program as disclosed in FIG. 5a or 5b.

The bus 301 links the processor 300 to a read only memory ROM 302, a random access memory RAM 303 and a network interface 306.

The memory 303 contains registers intended to receive variables and the instructions of the program related to the algorithm as disclosed in FIG. 5a or 5b.

The processor 300 receives through the network interface 306 feedback information from measurement collecting devices ME that is forwarded by wireless radio units.

The read-only memory, or possibly a Flash memory 302 contains instructions of the program related to the algorithm as disclosed in FIG. 5a or 5b, when the server Serv is powered on, to the random access memory 303.

The server Serv may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the server Serv includes circuitry, or a device including circuitry, causing the server Serv to perform the program related to the algorithm as disclosed in FIG. 5.

FIG. 4 represents an example of an algorithm executed by the measurement collecting device according to the present invention.

The present algorithm is disclosed in an example wherein it is executed by the processor 200.

At step S400, the processor 200 checks if it is time to start a new measurement window. For example, a measurement window is performed every minute and has a duration of ten seconds.

If it is time to start a new measurement window, the processor 200 moves to step S401. Otherwise, the processor 200 returns to step S400.

At step S401, the processor 200 obtains from the wireless interfaces measurements related to interference.

For example measurements related to interference are performed every millisecond.

At next step S402, the processor 200 checks if the measurement window has to be interrupted.

If the measurement window has to be interrupted, the processor 200 returns to step S401. Otherwise, the processor 200 moves to step S403.

At step S403, the processor 200 processes the measurements performed during the measurement window.

For example, the processor 200 forms an histogram of a collection of triplets values (t,z,w) containing a time period index t wherein plural measurements are performed if the points are uniformly spaced in time, the quantized interference-related value z like interference power in dB, SINR in dB and a weight w like for example, the number of measurements made within the time period index t which have the same quantized interference-related value z.

For example, the time periods and the quantization are constant.

For example, the time periods and/or the quantizations are variable. In that case, the histogram computed for each cluster of time has different dynamics. In other words, the histogram is not regular and the histogram definition like center of the bins, also called centroids when associated with a quantizer is computed by using a vector quantizer, such as the k-means algorithm.

For example, the processor 200 applies a k-means algorithm that determines a codebook of centroids associated to non-regular quantization cells.

Thus, the triplets (t,z,w) are directly given by the k-means algorithm where the coordinates t(k), z(k) are centroid coordinates of a quantization cell and w(k) the weight of the quantization cell of the centroid and k is the index of the feedback triplets (t,z,w) with k=1 to K. The computation of the centroid is done online. The weight of the quantization cell is incremented when a measurement has a closer distance metric with the centroid of the cell than with any other centroid. Usually, the euclidean distance is used.

At next step S404, the processor 200 commands the transfer of triplets of the formed histograms through the wireless interface 205 to the wireless radio unit WRU which forwards the formed triplets to the server Serv. For example, if the time period and the quantization are constant, the transfer only contains the weights w. If the time period and the quantization are not constant, triplets of values are transferred.

FIG. 5a represents a first example of an algorithm executed by the server according to the present invention.

The present algorithm is disclosed in an example wherein it is executed by the processor 300.

At step S500, the processor 300 receives through the network interface 306 triplets of the histograms formed by a measurement collecting device ME or the weights w if the time period and the quantization are constant.

At next step S501, the processor 300 obtains the trajectory of the train in which the measurement collecting device ME is included.

The database stored in the server Serv comprises a collection of discrete values relative to the random distribution of interference information. The database is for example under the form of at least one matrix DB, each matrix being related to a region covered by the system. The matrix is for example a (I*J) matrix. Each stored value in the cluster DB(i,j) is associated to a position x(i) and a value y(j), where x is the vector of positions quantizing the possible positions of the train within the region and y is the vector of values quantizing the range of interference-related values. The conversion of the histograms formed by a measurement collecting device ME into a format corresponding to the database's one depends on the histogram format.

At next step S502, the processor 300 processes the received histograms or weights w if the time period and the quantization are constant.

The processor 300 determines position or positions in the database, or in other words clusters of the matrix of the database, which corresponds or correspond to each triplet or weight.

The processor 300 uses a mapping function TP( ) that corresponds to the trajectory of the train and allows to map the time period index to a position along the railway RL.

For a given feedback index k with values (t(k),z(k),w(k)) the processor 300 finds the index i'(k) such that such |TP(t(k))−x(i'(k))| is minimized.

Thus, i'(k) is the row index of the position in the database corresponding to the position of the measurement collecting device ME for the k-th measurement at time t(k) in the measurement window.

The processor 300 further uses a mapping function ML( ) that allows to map the value stored in the database to the quantized interference-related value z. The mapping function ML( ) is preferably bijective. For example, one can feedback a SINR level in dB and store it in linear.

Then, for a given feedback index k with values (t(k),z(k),w(k)) we can find the column index j'(k) such that such |ML(z(k))−y(j'(k))| is minimized. Thus, j'(k) is the column index in the database corresponding to the transformation of the k-th quantized interference-related value z into a value relative to the random distribution of interference information and quantized according to the database format.

The processor 300 further uses a temporary database DBT having the same size as the database DB, first initialized with zeros values.

More precisely, the processor 300 converts the received quantized interference-related value z and fills the clusters of the temporary database DBT.

The processor 300 increments each cluster value DBT(i'(k),j'(k)) by w(k).

If a k-means algorithm is used by the measurement collecting device ME that determines a codebook of centroids associated to non-regular quantization clusters, the processor 300 superimposes the clustering grid of the matrix of the temporary database DBT or of the matrix of the database DB as they have the same size to the voronoi regions defined by the centroid.

A direct quantization of the received histogram with the database DB clusters may associate some measurements via their centroid to the wrong position x(i'(k)) and a value y(j'(k)).

The processor 300 applies then a mask in the conversion process, i.e. by not only setting each cluster value DBT(i'(k),j'(k)) by w(k) but by incrementing all the cluster values DBT(i,j) by w(k)*M(i,j,TP(t(k)),ML(z(k))) values where i varies from 1 to I and j from 1 to J. For example M(i,j,TP(t(k)),ML(z(k)))=1 if the centroid (x(i),y(j)) is the closest of the point (TP(t(k)),ML(z(k))) according to the distance metric, for example the euclidean distance and M(i,j,TP(t(k)),ML(z(k)))=0 otherwise. In another option, M(i,j,TP(t(k)),ML(z(k)))=1/a, where a is the sum of the M(i,j,TP(t(k)),ML(z(k))) values for all i and j.

In another example, an independent mask is applied in the position and values dimensions, such that M(i,j,TP(t(k)),ML(z(k)))=Mp(i,TP(t(k)))+Mv(j,ML(z(k))) when the database DB relates to interference information expressed in decibel, or M(i,j,TP(t(k)),ML(z(k)))=Mp(i,TP(t(k)))*Mv(j,ML(z(k))) when the database DB relates to interference information in the linear domain.

Mp( ) is a mask related to positions in the temporary database DBT and Mv is a mask applied to the weights in the temporary database DBT.

It has to be noted here that if the received quantized interference-related value is expressed in dB in a system wherein fading occurs, the distribution of the fading in dB is non symmetric.

If an interference is received with an average power Pi (dB), measurements according to the distribution of the fading in dB are shifted by Pi dB.

For example, a measurement attenuated by −20 dB is less probable than one at 0 dB, and its weight in the clustering computation should be less. The metric for building the clusters is then associated to probability density function of the fading.

In this case one can choose Mv(j,ML(z(k))))=pv(|ML(z(k)))−y(j)|), where pv is the probability density function of the fading in dB, e.g., $$pv(a) = \frac{\log(10)}{10} 10^{\frac{a}{10}} e^{-10^{\frac{a}{10}}}$$

Equivalently, the mask in the position dimension can follow a typical path loss model, which leads to Mp(i,TP(t(k)))=pp(|TP(t(k))−x(i)|) and pp(b)=α+β log 10(|b|)

where α and β are parameters that can be tuned according to the environment.

In another example, the parameters α(i) and β(i) also depend on the location along the railway, which leads to Mp(i,TP(t(k)))=pp(i,|TP(t(k))−x(i)|) and pp(i,b)=α(i)+β(i)log 10(|b|)

At next step S503, the processor 300 merges the temporary database DBT to the database DB.

In other words, the present invention locates the cluster of the database DB associated to the position and the value stored in the database DBT related to the k-th measurement, and combines the weights comprised in the clusters of the temporary database DBT of measurements falling in the same cluster of the database DB together.

The processor 300 merges the temporary database DBT with the database DB, for example by using a weighted averaging of the discrete estimation of the probability density function. First, the processor 300 defines N(i) as the sum of the weights of the i-th row of the database DB.

For each row i of the database matrix DB and of the temporary database DBT, the processor 300 performs the following computation:
computes N'(i) as the sum of the weight DBT(i,j) of the i-th row of the temporary database,
sets for each row i, the value DB(i,j) to (DB(i,j)*N(i)+DBT(i,j))/(N(i)+N'(i))
updates N(i) to N(i)+N'(i);
Alternatively, the processor 300 performs the following computation:
normalizes the temporary database DBT in a normalized temporary database NDBT such that the sum of its i-th row is equal to one,
sets for each row i, the value DB(i,j) to (DB(i,j)*N(i)+NDBT(i,j))/(N(i)+1)
updates N(i) to N(i)+1;
Alternatively, the processor 300 performs the following computation:
normalizes the temporary database DBT in a normalized temporary database NDBT such that the sum of its j-th column is equal to one,
sets for each row i, the value DB(i,j) to DB(i,j)+μ*(NDBT(i,j)−DBT(i,j)) (where μ<1).

FIG. 5b represents a second example of an algorithm executed by the server according to the present invention.

At step S550, the processor 300 receives through the network interface 306 histograms formed by a measurement collecting device ME or the weights w if the time period and the quantization are constant.

At next step S551, the processor 300 obtains the train trajectory of the train in which the measurement collecting device ME is included.

The database stored in the server Serv comprises a collection of discrete values relative to the random distribution of interference information. The database is for example under the form of at least one matrix DB, each matrix being related to a region covered by the system. The matrix is for example a (I*J) matrix. Each stored value DB(i,j) is associated to a position x(i) and a value y(j), where x is the vector of positions quantizing the possible positions of the train within the region and y is the vector of values quantizing the range of interference-related values. The conversion of the histograms formed by a measurement collecting device ME into a format corresponding to the database's one depends on the histogram format.

At next step S552, the processor 300 processes the received histograms or weights w if the time period and the quantization are constant.

The processor 300 determines position or positions in the database, or in order words clusters of the matrix of the database, which corresponds or correspond to each triplet or weight.

The processor 300 uses a mapping function TP( ) that corresponds to the trajectory of the train and allows to map the time period index to a position along the railway RL.

For a given feedback index k with values (t(k),z(k),w(k)) the processor 300 finds the index i'(k) such that such |TP(t(k))−x(i'(k))| is minimized.

Thus, i'(k) is the row index of the position in the database corresponding to the position of the measurement collecting device ME for the k-th measurement at time t(k) in the measurement window.

The processor 300 further uses a mapping function ML( ) that allows to map the value stored in the database to the quantized interference-related value z. The mapping function ML( ) is preferably bijective. For example, one can feedback a SINR level in dB and store it in linear.

Then, for a given feedback index k with values (t(k),z(k),w(k)) we can find the column index j'(k) such that such |ML(z(k))−y(j'(k))| is minimized. Thus, j'(k) is the column index in the database corresponding to the transformation of the k-th quantized interference-related value z into a value relative to the random distribution of interference information and quantized according to the database format.

The processor 300 further uses a temporary database DBT having the same size as the database DB, first initialized with zeros values.

More precisely, the processor 300 converts the received quantized interference-related value z and fills the clusters of the temporary database DBT.

The processor 300 increments each cluster value DBT(i'(k),j'(k)) by w(k).

At next step S503, the processor 300 merges the temporary database DBT to the database DB.

In other words, the present invention locates the cluster of the database DB associated to the position and the value stored in the database DBT related to the k-th measurement, and combines the weights comprised in the clusters of the temporary database DBT of measurements falling in the same cluster of the database DB together.

The processor 300 merges the temporary database DBT with the database DB, for example by using a weighted averaging of the discrete estimation of the probability density function. First, the processor 300 defines N(i) as the sum of the weights of the i-th row of the database DB.

For each row i of the database matrix DB and of the temporary database DBT, the processor 300 performs the following computation:
  computes N'(i) as the sum of the weight DBT(i,j) of the i-th row of the temporary database,
    sets for each row i, the value DB(i,j) to (DB(i,j)*N(i)+DBT(i,j))/(N(i)+N'(i)),
    updates N(i) to N(i)+N'(i).

Alternatively, the processor 300 performs the following computation:
  normalizes the temporary database DBT in a normalized temporary database NDBT such that the sum of its i-th row is equal to one,
    sets for each row i, the value DB(i,j) to (DB(i,j)*N(i)+NDBT(i,j))/(N(i)+1),
    updates N(i) to N(i)+1.

Alternatively, the processor 300 performs the following computation:
  normalizes the temporary database DBT in a normalized temporary database NDBT such that the sum of its i-th row is equal to one,
    sets for each row i, the value DB(i,j) to DB(i,j)+µ*(NDBT(i,j)−DBT(i,j)) (where µ<1).

If a k-means algorithm is used by the measurement collecting device ME that determines a codebook of centroids associated to non-regular quantization clusters, the processor 300 superimposes the clusters of the matrix of the database DB to the voronoi regions defined by the centroid.

A direct quantization of the received histogram with the database DB may associate some measurements via their centroid to the wrong position x(i) and a value y(j).

The processor 300 applies then a mask in the merging process, i.e. by not only updating the value DB(i,j) with DBT(i,j) but by incrementing all the clusters values DB(i,j) by DBT(i",j")*M"(i",i,j"j) values where i" and j" denote the indexes of the temporary database DBT. For example M"(i",i,j",j)=1 if the centroid (x(i),y(j)) is the closest of the point (x(i'),y(j')) according to the distance metric, for example the euclidean distance and M"(i",i,j",j)=0 otherwise. In another option, M"(i",i,j",j)=1/a, where a is the sum of the M"(i",i,j",j) values for all i" and j".

In another example, an independent mask is applied in the position and values dimensions, such that M"(i",i,j",j)=Mp"(i",i)+Mv"(j",j) when the database DB relates to interference information expressed in decibel, or M"(i",i,j",j)=Mp"(i",i)×Mv"(j",j) when the database DB relates to interference information in the linear domain.

Mp"( ) is a mask related to positions in the temporary database DBT and Mv is a mask applied to the weights in the temporary database DBT.

It has to be noted here that if the received quantized interference-related value is expressed in dB in a system wherein fading occurs, the distribution of the fading in dB is non symmetric.

If an interference is received with an average power Pi (dB), measurements according to the distribution of the fading in dB are shifted by Pi dB.

For example, a measurement attenuated by −20 dB is less probable than one at 0 dB, and its weight in the clustering computation should be less. The metric for building the clusters is then associated to probability density function of the fading.

In this case one can choose Mv"(j",j)=pv(|y(j")−y(j)|), where pv is the probability density function of the fading in dB, e.g., $$pv(a) = \frac{\log(10)}{10} 10^{\frac{a}{10}} e^{-10^{\frac{a}{10}}}$$

Equivalently, the mask in the position dimension can follow a typical path loss model, which leads to Mp"(i",i)=pp(|x(i")−x(i)|) and $$pp(b) = \alpha + \beta \log 10(|b|)$$

where α and β are parameters that can be tuned according to the environment.

In another example, the parameters α(i) and β(i) also depend on the location along the railway, which leads to Mp"(i",i)=pp(i,|x(i")−x(i)|) and $$pp(i,b) = \alpha(i) + \beta(i) \log 10(|b|)$$

Naturally, many modifications can be made to the embodiments of the invention described above without departing from the scope of the present invention.

The invention claimed is:

1. Method for quantizing an interference profile for a wireless telecommunication system along a path that a moving device takes characterized in that the method comprises the steps of:
   obtaining, by the moving device, during a measurement windows, measurements related to interference in the wireless telecommunication system along the path,
   processing, by the moving device, the measurements performed during the measurement window in order to obtain for consecutive time periods of the measurement window at least a quantized interference related value from measurements performed within the time period and a weight representative of the number of measurements made within the time period index which have the same quantitized interference-related value,
   transferring, by the moving device, feedback information which comprises at least the weights to a server through the wireless telecommunication system,
   receiving, by the server, the feedback information,
   determining, by the server, the location of the moving device along the path which corresponds to the measurement window,
   converting, by the server, the feedback information in a format of a database composed of a matrix comprising locations and interference quantization values,
   updating the database with the converted feedback information.

2. Method according to claim 1, characterized in that the feedback information further comprises, for each weight, a time period index and a quantized interference value.

3. Method according to claim 1, characterized in that the feedback information further comprises, for each weight, centroid coordinates corresponding to the weight.

4. Method according to claim 1, characterized in that the converting of the feedback information is performed using a first mapping function that maps the time periods to locations of the moving device along the path and using a second mapping function that maps weights to a format of interference-related values stored in the database.

5. Method according to claim 4, characterized in that the converting of the feedback information is further performed from the results of the mapping functions and using a temporary database having the same size as the database, the databases being under the form of matrices and in that the matrix of the temporary database is updated using the mapped weights.

6. Method according to claim 5, characterized in that the temporary database is a normalized temporary database such that the sum of each column of the normalized temporary database is equal to one.

7. Method according to claim 4, characterized in that if feedback information further comprises for each weight centroid coordinates corresponding to the weight, the converting of the feedback information is further performed by superposing the matrix of the database to voronoi regions defined by the centroid and by applying a mask related to clusters positions in the temporary database and each mapped weight is used for updating the matrix of the temporary database according to the mask related to clusters positions in the temporary database.

8. Method according to claim 6, characterized in that the converting of the feedback information is further performed by applying a mask related to the mapped weights in the temporary database and each mapped weight is used for updating the matrix of the temporary database according to the mask related to the quantitized interference-related values.

9. Method according to claim 5, characterized in that the update of the database with the converted feedback information is performed by merging each mapped weight value in a cluster of the matrix of the temporary database weighted at least by the sum of the mapped weights in the column of the cluster and by the sum of the mapped weights in the row of the cluster to the cluster having the same position in the matrix of the database.

10. Method according to claim 1, characterized in that if feedback information further comprises for each weight centroid coordinates corresponding to the weights, the update of the database with the converted feedback information is performed by superposing the matrix of the database to voronoi regions defined by the centroid and by applying a mask related to clusters positions in the database and each mapped weight is used for updating the matrix of the database according to the mask related to clusters positions in the database.

11. Method according to claim 10, characterized in that the update of the database with the converted feedback information is performed by applying a mask related to the mapped weights in the database and each mapped weight is used for updating the matrix of the database according to the mask related to the mapped weights.

12. Method according to claim 5, characterized in that the update of the database with the converted feedback information is performed by merging each mapped weight in a cluster of the matrix of the temporary database weighted at least by the sum of the mapped weights in the column of the cluster and by the sum of the mapped weights in the row of the cluster to the cluster having the same position in the matrix of the database.

13. System for quantizing an interference profile for a wireless telecommunication system along a path that a moving device takes characterized in that the system comprises a first processor and first input output interface disposed in a server and a second processor and second input output interface disposed in the moving device:
  wherein the second processor:
    obtains during a measurement windows, measurements related to interference in the wireless telecommunication system along the path; and
    processes the measurements performed during the measurement window in order to obtain for consecutive time periods of the measurement window at least a quantized interference related value from measurements performed within the time period and a weight representative of the number of measurements made within the time period index which have the same quantitized interference-related value,
  wherein the second input output interface:
    transfers feedback information which comprises at least the weights to a server through the wireless telecommunication system,
  wherein the first input output interface:
    receives the feedback information,
  wherein the first processor:
    determines the location of the moving device along the path which corresponds to the measurement window;
    converts the feedback information in a format of a database composed of a matrix comprising locations and interference quantization values; and
    updates the database with the converted feedback information.

* * * * *